June 5, 1956     H. M. WILSON     2,749,138
PUSH SLED
Filed May 15, 1952
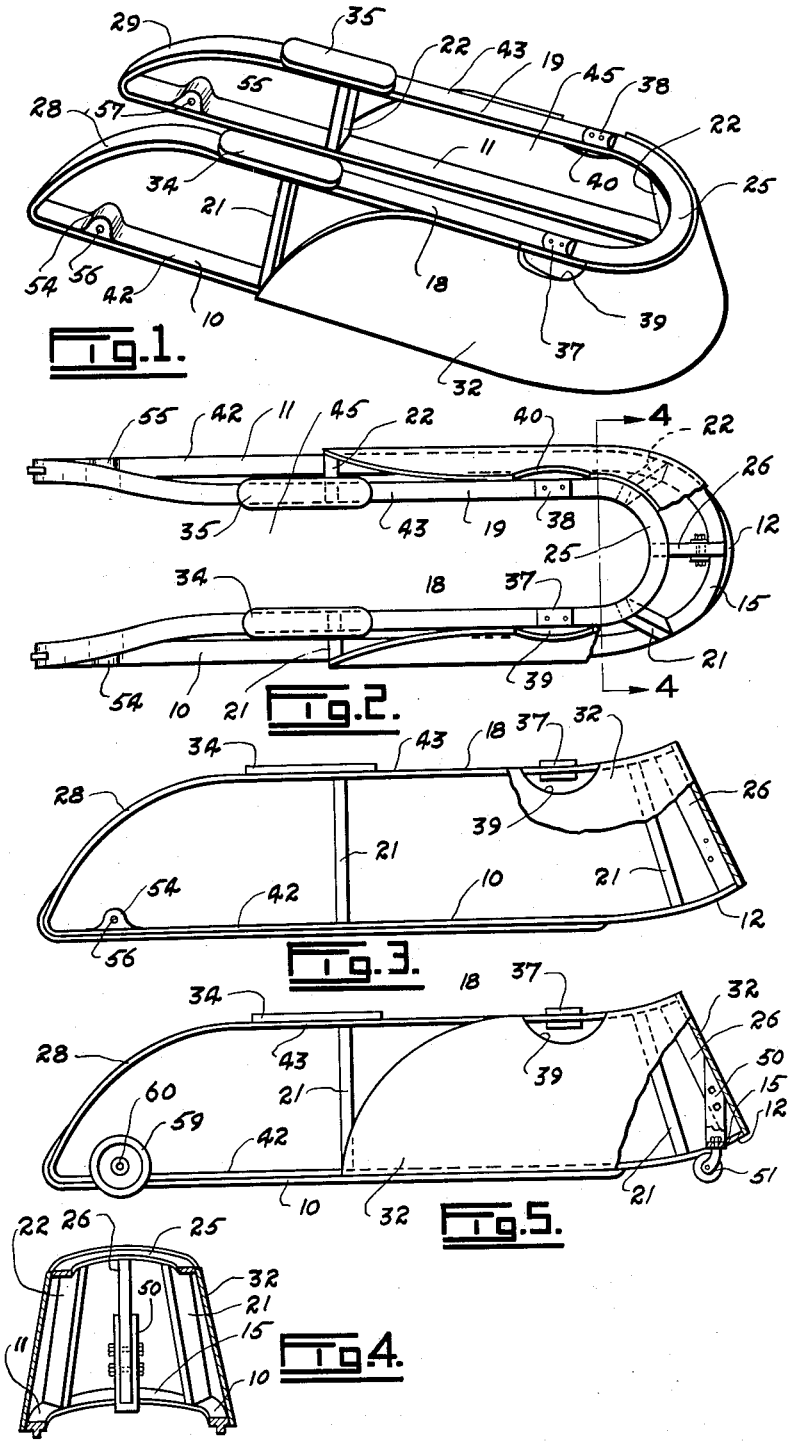
INVENTOR
HUGH M. WILSON
BY
Fetherstonhaugh & Co.
ATTORNEYS

United States Patent Office 2,749,138
Patented June 5, 1956

2,749,138

PUSH SLED

Hugh M. Wilson, Nanaimo, British Columbia, Canada

Application May 15, 1952, Serial No. 287,848

3 Claims. (Cl. 280—8)

This invention relates to improvements in sleds for children.

An object of the present invention is the provision of a sled which may be propelled by a child kneeling on it with one knee and pushing against the snow with the other foot in much the same manner as wagons are propelled.

Another object is the provision of a sled which is open in the centre so that a child may kneel on one side thereof and propel the sled with his foot in the open area.

Another object is the provision of a sled which may be easily converted to a vehicle to be used on the ground when the snow is not available.

With the children's sleds now in common use, it is not practical to propel them in the same manner as a wagon owing to the comparatively great resistance of the snow against the runners. It has, however, been discovered that if the child can push with one foot substantially along the centre line of the sled, that it may be propelled in the same manner as a wagon. In accordance with this, the present sled includes a pair of spaced-apart parallel runners having their forward ends turned upwardly, and means rigidly connecting the runners adjacent their forward ends so that the runners are maintained mutually parallel, leaving a clear space between the runners rearwardly from said ends. A supporting frame is provided over at least one runner upon which a child may kneel.

An example of this invention is illustrated in the accompanying drawings, in which:

Figure 1 is a perspective view of the sled,

Figure 2 is a plan view thereof,

Figure 3 is a side elevation, with parts thereof broken away,

Figure 4 is a cross section taken on the line 4—4 of Figure 2, and

Figure 5 is a side elevation, partly in section showing the sled fitted with wheels for summer use.

Referring to the drawings, runners 10 and 11 are spaced from and parallel with each other. These runners are turned upwardly at their forward ends, as indicated at 12 in Figure 3. Means is provided for rigidly connecting the runners at their forward ends so that the runners are maintained mutually parallel, and this may consist of a curved cross bar 15 which extends from the forward end of one runner across to the forward end of the other.

A supporting frame extends upwardly from at least one runner. In this example, there is a supporting frame above each runner and these consist of supporting strips 18 and 19 respectively mounted on a plurality of substantially vertical braces 21 and 22. These supporting strips extend substantially the length of the runners and are parallel therewith. If desired, the supporting strips may be located slightly inwardly of their respective runners, as clearly shown in Figure 2, in which case the braces 21 and 22 slope inwardly from the runners to the strips. These strips are connected together at their forward ends by a curved cross bar 25 which is similar to and spaced rearwardly from the cross bar 15 of the runner. A brace 26 may extend between the bars 15 and 25 centrally thereof, see Figure 2. The rearward ends of the strips 18 and 19 may be bent downwardly as at 28 and 29 and connect to the rearward ends of their respective runners. A shield 32 may extend around the forward ends of the runners, supporting strips, and their cross bars.

Knee pads 34 and 35 may be mounted on the supporting strips 18 and 19 adjacent the rearward ends thereof. Furthermore, hand grips 37 and 38 may be mounted on the strips adjacent their forward ends, in which case hand holes 39 and 40 may be formed in the shield 32.

The runners and supporting strips may be constructed in any convenient manner. However, it has been found advantageous to form the runners and strips with their respective cross bars from single pieces of material bent in substantially horizontal U shapes 42 and 43, 42 being the runner U and 43 the supporting strip U, in fact, both U's may be formed from a single strip of material since the portions 28 and 29 of the strips are connected to the runners.

In use, the child kneels on either pad 34 or 35 and pushes against the snow with his other leg within the space 45 which is formed between the runners and their supporting frames and extends from the forward end of the sled towards the back thereof. The child may grip the supporting frames at the grips 37 and 38. When in this position, the child's propelling leg is located centrally of the sled so that he obtains the maximum benefit for his exertions.

If it is desired to convert the sled for use in the summer time, a supporting bracket 50 may be secured to and extend downwardly from the central brace 26, see Figure 5. A castor 51 is pivotally connected to the lower end of this bracket. Bearings 54 and 55 having passages 56 and 57 extending therethrough are mounted on the runners 10 and 11 adjacent the rearward ends thereof. Wheels 59 are provided having axles 60 which fit into the passages 56 and 57 of the bearings.

When the castor 51 and wheels 59 are in place, the sled may be propelled in the manner described above on the ground or over smooth surfaces.

What I claim as my invention is:

1. A sled comprising a pair of spaced-apart parallel runners having their forward ends turning upwardly, a cross bar rigidly connecting the forward ends of the runners, a supporting strip above each runner extending longitudinally thereof, a cross bar rigidly connecting the forward ends of the strips, said runners and strips with their respective cross bars being formed from single pieces of material bent in substantially horizontal U-shapes leaving a clear unobstructed space between the runners and strips at opposite sides of the sled extending rearwardly from the cross bars thereof and opening out at the back of the sled, bracing means extending upwardly from the runners for carrying the supporting strips, and a knee pad mounted on at least one of the supporting strips spaced rearwardly from the front end thereof.

2. A sled comprising a pair of spaced-apart parallel runners having their forward ends turning upwardly, a cross bar rigidly connecting the forward ends of the runners, a supporting strip above each runner extending longitudinally thereof, a cross bar rigidly connecting the forward ends of the strips, said runners and strips with their respective cross bars being formed from single pieces of material bent in substantially horizontal U-shapes leaving a clear unobstructed space between the runners and strips at opposite sides of the sled extending rearwardly from the cross bars thereof and opening out at the back of the sled, bracing means extending upwardly from the runners and their cross bar for carrying the supporting strips and their cross bars, a shield extending around the forward end of the sled, a knee pad mounted on at least one of the supporting strips spaced rearwardly from the forward end thereof, and hand grips on both strips ahead of the knee pad.

3. A sled comprising a pair of spaced-apart parallel runners having their forward ends turning upwardly, means rigidly connecting the runners adjacent their forward ends so that they are maintained mutually parallel and leaving a clear space between the runners rearwardly from said ends and opening out from the back of the sled, a supporting frame extending upwardly from each runner and extending throughout most of the length of the latter, said frames having portions substantially parallel with the runners, means rigidly connecting the frames adjacent their forward ends, said supporting frames being located on opposite sides of the clear space between the runners, whereby said space extends upwardly without obstructions between the frames, a swivel castor removably mounted on the means connecting the forward end of the runners and extending below the latter, and a wheel removably mounted on each runner and projecting therebelow adjacent the back end thereof.

References Cited in the file of this patent

UNITED STATES PATENTS

| | | |
|---|---|---|
| 837,230 | Jorgenson | Nov. 27, 1906 |
| 1,445,219 | Larson | Feb. 13, 1923 |
| 1,608,378 | Engel | Nov. 23, 1926 |
| 1,834,979 | Skoglund | Dec. 8, 1931 |
| 2,285,778 | Milward | June 9, 1942 |
| 2,437,903 | Zullig | Mar. 16, 1948 |
| 2,565,257 | Nichol | Aug. 21, 1951 |

FOREIGN PATENTS

| | | |
|---|---|---|
| 182,962 | Canada | Mar. 19, 1918 |
| 98,033 | Austria | Sept. 25, 1924 |
| 43,842 | Switzerland | Mar. 26, 1908 |